United States Patent
Lim et al.

(10) Patent No.: US 6,805,729 B2
(45) Date of Patent: Oct. 19, 2004

(54) SYSTEM AND METHOD FOR HANDLING FLUID USING A MANIFOLD

(75) Inventors: Kim Hong Lim, Annandale, VA (US); Franklin D. Lomax, Jr., Arlington, VA (US); John S. Lettow, Washington, DC (US); Khalil M. Nasser, Alexandria, VA (US)

(73) Assignee: H2Gen Innovations, Inc., Alexandria, VA (US)

( * ) Notice: Subject to any disclaimer, the term of this patent is extended or adjusted under 35 U.S.C. 154(b) by 0 days.

(21) Appl. No.: 10/282,140

(22) Filed: Oct. 29, 2002

(65) Prior Publication Data

US 2004/0079227 A1 Apr. 29, 2004

(51) Int. Cl.⁷ .............................. B01D 53/02; C02F 9/00
(52) U.S. Cl. .............................. 95/135; 95/287; 96/126; 96/132; 96/133; 55/482.1; 55/485; 210/314; 210/420
(58) Field of Search .............................. 95/135–137, 90, 95/268, 287; 210/806, 232, 264, 314, 418, 420, 423, 456, 184; 96/121, 126, 131, 132, 133, 134, 421; 55/344, 482.1, 485; 137/571

(56) References Cited

U.S. PATENT DOCUMENTS

| | | | | |
|---|---|---|---|---|
| 1,593,137 A | * | 7/1926 | O'Rourke et al. ............. | 96/131 |
| 3,577,988 A | * | 5/1971 | Jones ..................... | 128/201.25 |
| 4,659,460 A | * | 4/1987 | Muller et al. .................. | 210/93 |
| 4,944,875 A | * | 7/1990 | Gaignet ....................... | 210/232 |
| 5,045,197 A | | 9/1991 | Burrows | |
| 5,407,571 A | * | 4/1995 | Rothwell .................... | 210/232 |
| 5,713,985 A | * | 2/1998 | Hamilton ....................... | 95/90 |
| 5,798,040 A | * | 8/1998 | Liang .......................... | 210/232 |
| 5,843,381 A | * | 12/1998 | Bland et al. ................. | 422/197 |
| 6,379,560 B1 | * | 4/2002 | Tilp et al. ................... | 210/748 |
| 6,436,282 B1 | * | 8/2002 | Gundrum et al. ........... | 210/117 |
| 2003/0102257 A1 | * | 6/2003 | Reid .......................... | 210/232 |

* cited by examiner

*Primary Examiner*—Frank M. Lawrence
(74) *Attorney, Agent, or Firm*—Oblon, Spivak, McClelland, Maier & Neustadt, P.C.

(57) ABSTRACT

A manifold assembly including a unitary manifold body including at least two component ports and an integral channel system connecting the component ports in series, and at least two fluid-treating components directly connected to the component ports in a substantially gas-tight manner. The fluid-treating components can include at least one of a coalescer, an adsorber, an absorber, a strainer, and a filter. At least one of the component ports includes an inner port section and an outer port section, the outer port section including a flow distributor arranged around and concentric to the inner port section.

44 Claims, 3 Drawing Sheets

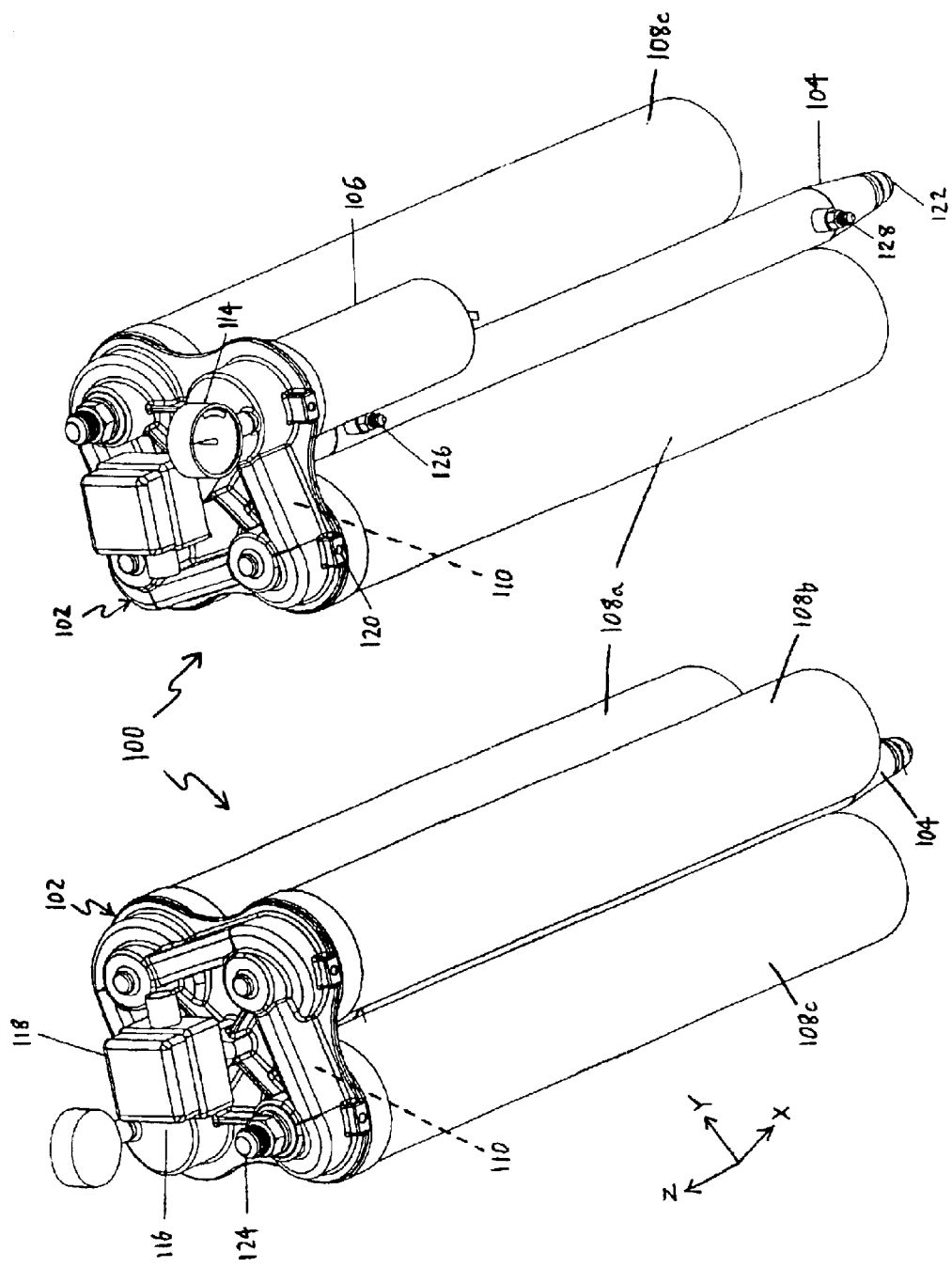

0
SYSTEM AND METHOD FOR HANDLING FLUID USING A MANIFOLD

BACKGROUND OF THE INVENTION

The present invention is generally related to fluid treatment systems and, more particularly, to a fluid manifold assembly.

Existing fluid treatment systems have a wide range of applications, including purification (e.g., particle removal) and conditioning (e.g., cooling or heating) of both gases and liquids, and use a variety of separate fluid-treatment components, such as filters, coalescers, adsorbers, and absorbers. To create a complete system, such components are typically mounted to a structural framework and connected to one another by way of various attaching elements, such as hoses, seals, and fasteners. For example, known systems are created by connecting a first fluid-treating component to a second fluid-treating component by way of a set of attaching elements, and then connecting the second fluid-treating component to a third fluid-treating component by way of another set of attaching elements, and so on. Fluid to be treated is then directed through the attached components and the intervening attaching elements to achieve a desired result.

However, multiple disadvantages exist for such systems. For systems requiring the use of a relatively large number of fluid-treating components, the linear attaching of fluid-treating components using multiple sets of attaching elements as described above creates a system requiring a large amount of operating space. In addition, each set of attaching elements required to couple two fluid-treating components represents an additional cost. Also, the use of multiple attaching element sets results in an increase of potential leak points in the system. Further, due to their linear nature, known systems do not facilitate easy exchanging or replacing of fluid-treating components.

BRIEF SUMMARY OF THE INVENTION

Accordingly, the present invention advantageously provides a novel system for handling fluid in a manner that is reliable, compact, flexible, and inexpensive.

In accordance with a first aspect of the present invention, there is provided manifold assembly including a unitary manifold body. The manifold body includes at least two component ports and an integral channel system connecting the component ports in series. At least two fluid-treating components are directly connected to the component ports in a substantially gas-tight manner.

In accordance with another aspect of the present invention, there is provided a fluid manifold including a manifold body. The manifold body has a first side including a plurality of component ports, each of which is configured to directly attach to a fluid-treating component in a substantially gas-tight manner. The manifold body also includes an integral channel system connecting each of the component ports in series, where the integral channel system is substantially arranged in a plane.

In accordance with a further aspect of the present invention, there is provided a method of handling fluid. The method includes connecting at least two fluid-treating components directly to a unitary manifold body. The manifold body includes a first side including at least two component ports configured to directly attach to the fluid-treating components in a substantially gas-tight manner. The manifold body also includes an integral channel system connecting each of the component ports in series. The method also includes directing a fluid through each of the fluid-treating components in series via the integral channel system.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are front and rear perspective views of a manifold assembly in accordance with an exemplary embodiment of the present invention.

DETAILED DESCRIPTION OF THE INVENTION

Figures 2A, 2B:
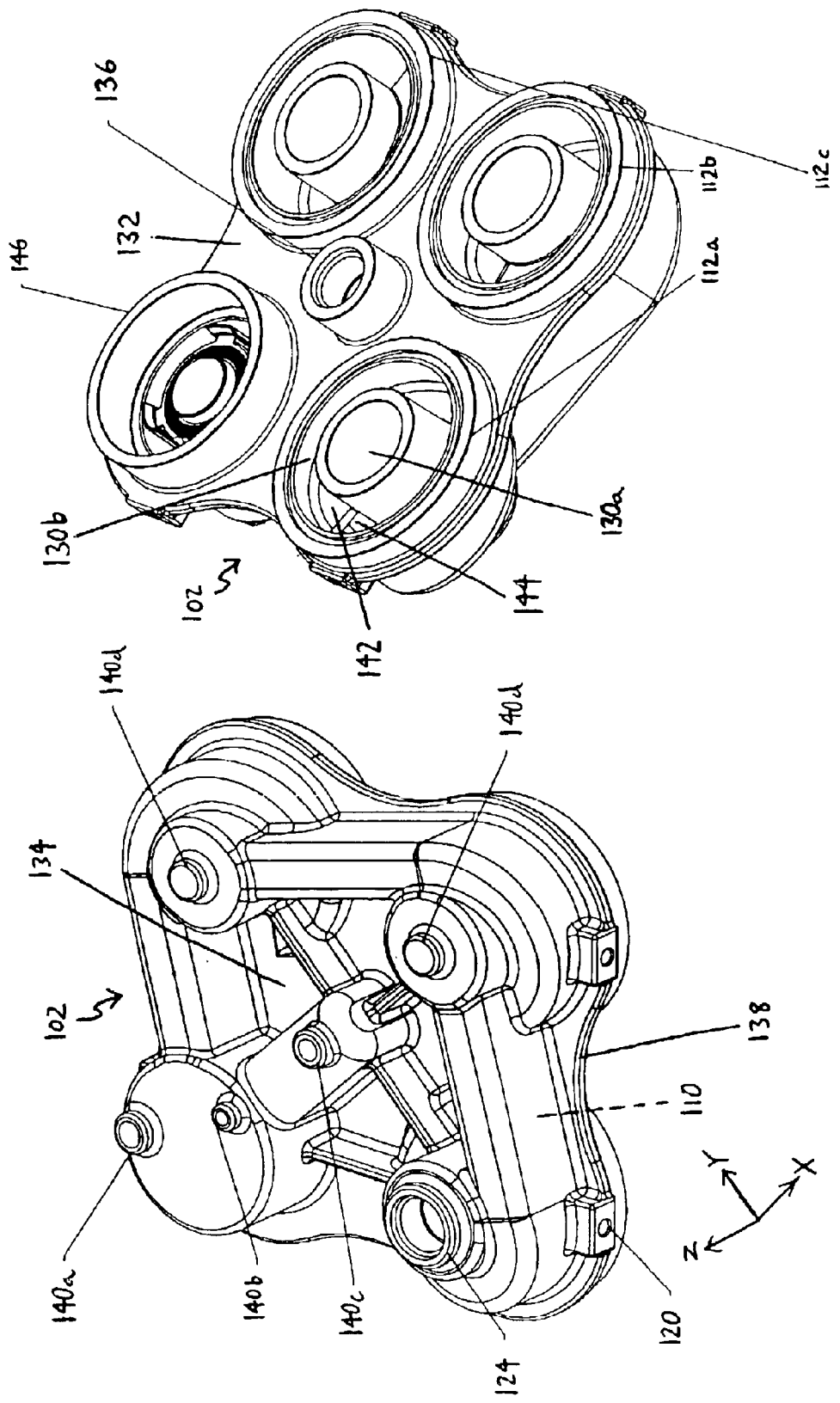
FIGS. 2A–2D are views of a manifold body used in the exemplary embodiment of FIGS. 1A and 1B.
Figure 2D:
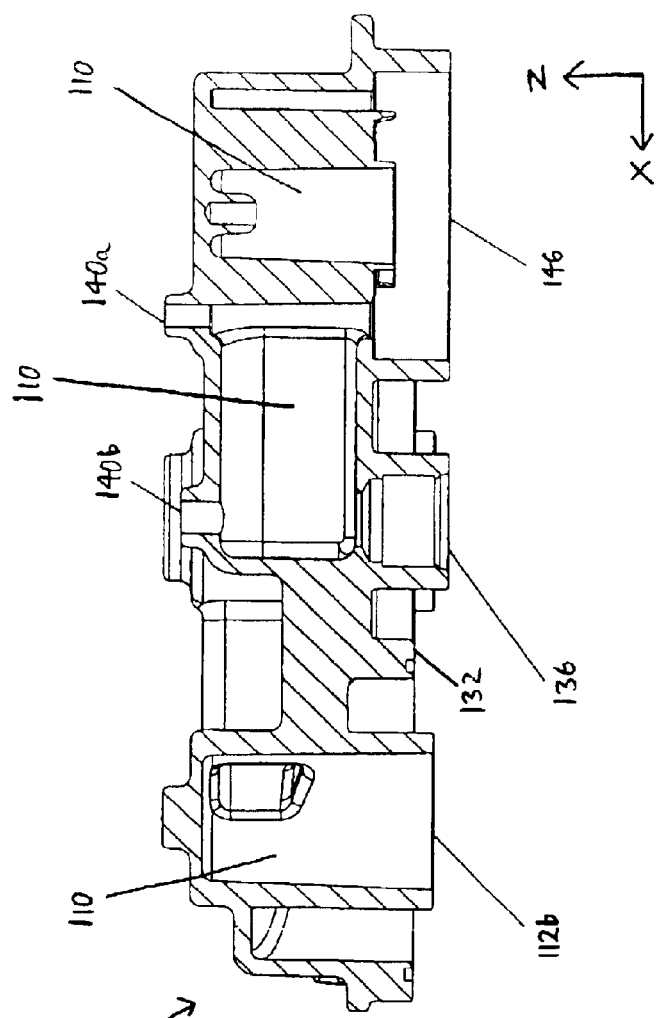
Figure 2C:
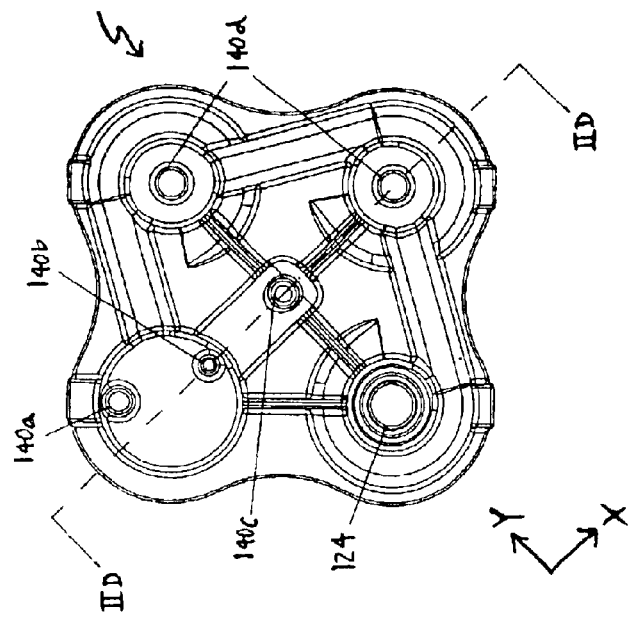

Referring now to the drawings, where like reference numeral designations identify the same or corresponding parts throughout the several views, several embodiments of the present invention are next described.

FIGS. 1A and 1B are two views of a manifold assembly 100, which can be used in a variety of fluid treatment applications. For example, manifold assembly 100 can be used to treat fluids in gas form (e.g., air or natural gas) or in liquid form, depending on the functions of the fluid-treating components included in manifold assembly 100. Moreover, manifold assembly 100 can be used in a wide range of operating conditions, such as in the conditioning of high-pressure gas, for example.

Manifold assembly 100 includes a manifold body 102, which can be made of metal, polymer, or any other formable material that exhibits the necessary properties for handling fluid to be treated. Manifold body 102 is preferably a unitary component such that a first side 132 and a second side 134 are cast, molded, machined, or otherwise formed as a single component from a formable material. Alternatively, the manifold body 102 can be constructed using separate components such that first side 132 and second side 134 are separate components that are attached by fasteners, adhesive bonding, brazing, soldering, welding, or any other means of attaching suitable for use in a fluid treatment system. Depending on the size, number, and shape of fluid-treating components to be attached to it, manifold body 102 can be scaled up or down to accommodate a wide variety of configurations. Manifold body 102 also includes mounting elements 120 (mounting elements 120 in FIG. 2A), which allow manifold body 102 to be mounted to another structure. Mounting elements 120 can be arranged as shown in the figures (i.e., as bosses provided with holes) or as any other mounting means known in the art.

First side 132 includes a plurality of components ports 146 and 112a-112c, each of which is configured to directly attach (e.g., without the use of an intervening attaching element) to a fluid-treating component in a substantially gas-tight manner. In the exemplary embodiment depicted in the figures, element 146 represents a coalescer port and elements 112a–112c represent bed ports. For purposes of this application, "substantially gas-tight" refers to a condition where either no amount or only a minimal amount of fluid is allowed to escape, as is known in the art. Component ports 146 and 112a–112c can be configured to directly attach to fluid-treating components by way of threads, a sealing compound, an elastomeric sealing element, or alternatively by any other method of direct attachment known in the art. Component ports 146 and 112a–112c are also arranged such that a flow of fluid between the component port and an attached fluid-treating component is substantially orthogonal to the plane (e.g., along the z-axis shown in FIG. 2A).

Manifold body 102 is also provided with an integral channel system 110 connecting each of the component ports in series, wherein the integral channel system is substantially arranged in the x-y plane shown in FIGS. 1A and 2A). For example, as shown in FIGS. 2A and 2B, integral channel system 110 connects in series the following elements in order of an exemplary fluid flow: inlet port 136, component port 146, component ports 112a–112c, and outlet port 124. Integral channel system 110 can be formed during formation of manifold body 102 (e.g., during a casting process) and can include channels of any profile usable for fluid transport.

Second side 134 is disposed opposite from first side 132 and includes outlet port 124. Outlet port 124 can be positioned opposite from a component port 112c (as shown in FIG. 2A) or, alternatively, can be disposed on first side 132 or on an edge side 138. Second side 134 is also provided with secondary ports (e.g., secondary ports 140a–140c), which are configured to interface with, for example, a thermocouple, a pressure gage, and high pressure switch (e.g., elements 116, 114, and 118 in FIG. 1A, respectively). Secondary ports 140a–140c can be configured to attach to these components using threads, interference fit, or any other means of attaching known in the art. Extra secondary ports 140d are also provided for attachment to any additional desired elements.

Manifold body 102 includes inlet port 136 (shown in FIG. 2B) on first side 132. Inlet port 136 is configured to directly connect to a heat exchanger (e.g., heat exchanger 104 in FIG. 1B) in a substantially gas-tight manner and is disposed in an area between component ports 146 and 112a–112c. Alternatively, inlet port 136 can be positioned on second side 134 or on an edge side 138. Alternatively or additionally, inlet port 136 can be configured to receive a fluid into manifold body 102 without being attached to a heat exchanger.

As shown in FIG. 2B, each one of component ports 112a–112c includes an inner port section 130a and an outer port section 130b. Component ports 112a–112c can be configured such that fluid enters through inner port sections 130a and exits through outer port sections 130b, or, alternatively, vice versa. Each outer port section 130b includes a flow distributor 142 arranged around and concentric to a corresponding inner port section 130a. Each flow distributor 142 is arranged as a helical ramp leading from an opening 144 to an elevated section of flow distributor 142 in closer proximity to the opening of the associated inner port section 130a. In this way, fluid can be distributed to and from each fluid-treating component directly attached to one of component ports 112a–112c.

Manifold assembly 100 is shown in FIGS. 1A and 1B as including at least two fluid-treating components (e.g., fluid-treating components 106 and 108a–108c) directly connected to the component ports of manifold body in a substantially gas-tight manner. For example, manifold assembly 100 can include three filter beds 108a–108c and one coalescer 106 as shown in the figures, or can alternatively include any number and combination of fluid-treating components necessary for a desired fluid treatment. As a non-limiting example, each one of filter beds 108a–108c can be arranged as a desiccant bed including adsorbent and/or absorbent materials. Coalescer 106 can be arranged to remove oil from a fluid, and filter beds 108a–108c can be arranged to remove water, oil vapor, halogens, and/or sulfur-containing molecules from a fluid. Further, fluid-treating components in manifold assembly 100 can include any combination of fluid-treating components known in the art, such as, but not limited to, coalescers, adsorbers, absorbers, strainers, and filters.

Adsorbent or absorbent beds may employ a variety of known materials that, singly or in combination, selectively remove contaminants from the fluid stream. Exemplary contaminant/adsorbent systems are hydrocarbon vapors on activated carbon, hydrogen sulfide on metal and metal oxide doped activated carbon, mercaptains and other sulfur-bearing organics on either of the above adsorbents or zeolites, and water on silica gel. Absorbers can be any components that perform a unit process where any contaminant that reacts with an absorbent is removed, e.g., hydrogen sulfide on zinc oxide. A coalescer is a special type of filter for removing condensable species from a gas by surface tension effects, e.g. oil or water droplets. Filters perform physical removal due to depth or surface mechanical exclusion, and perform well in removal of dust and larger particles.

Fluid-treating components 106 and 108a–108c can represent any combination of the components listed above. Also, fluid-treating components 106 and 108a–108c can be used for treating air, natural gas, or any other fluids known in the art.

As shown in FIGS. 1A and 1B, fluid-treating components 106 and 108a–108c are cylindrical in shape and have their longitudinal axes arranged substantially parallel to one another (e.g., along the z-axis in FIG. 1A). For purposes of this document, "substantially parallel" refers to a condition where components are within a permittable range of parallelism as is known in the art. Alternatively, fluid-treating components 106 and 108a–108c can be any other shape and orientation known in the art which allows for a compact system configuration.

Heat exchanger 104 is attached to inlet port 136 (shown in FIG. 2B) and includes a fluid inlet 126 and a fluid outlet 128 to perform a cooling or heating process on fluid introduced through heat exchanger 104 through inlet 122. Alternatively, heat exchanger 104 can be arranged as any other means known in the art for cooling or heating. Heat exchanger 104 can be cylindrical in shape or, alternatively, any other shape known in the art.

A method of handling fluid in accordance with an aspect of the present invention is now discussed. The method is provided with connecting at least two fluid-treating components (e.g., fluid-treating components 106 and 108) directly to a manifold body (e.g., manifold body 102). The manifold body includes a first side (e.g., first side 132) including at least two component ports (e.g., component ports 146 and 112a–112c) configured to directly attach to the fluid-treating components in a substantially gas-tight manner, and an integral channel system (e.g., integral channel system 110) connecting each of the component ports in series. As shown in FIGS. 1A and 1B, a coalescer 106 is connected to a coalescer port (represented in FIG. 2B as component port 146). First, second, and third filter beds 108a, 108b, and 108c are connected to first, second, and third bed ports 112a, 112b, and 112c, respectively (shown in FIGS. 1B and 2B). Also provided is a step of connecting a heat exchanger (e.g., heat exchanger 104) to an inlet port (e.g., inlet port 136) of the manifold body.

A fluid (e.g., air or natural gas) is supplied to manifold body 102 through inlet port 136, and the fluid can be can be conditioned before entering manifold body 102. For example, the fluid can be cooled or heated by a heat exchanger (e.g., heat exchanger 104) attached to inlet port 136. Also, the fluid can be supplied either in a high pressure or low pressure state.

After introduction into inlet port 136, the fluid is directed through integral channel system 110 to a first fluid-treating component, namely coalescer 106 connected to component port 146. Here, oil and/or water is coalesced from the fluid to created a filtered fluid, which is then directed through integral channel system 110 to a second fluid-treating component, namely first filter bed 108a. Adsorbable and/or absorbable constituents are then removed from the fluid, which is then directed to either subsequent fluid-treating components for further processing, namely second and third filter beds 108b and 108c or to an outlet port 124. For example, in the latter case, second and third filter beds 108b and 108c can be detached from the design and components ports 112b and 112c can be covered in a substantially gas-tight manner.

As the fluid progresses through filter beds 108a–108c, the contaminant compounds will gradually achieve equilibrium with the adsorbent and/or absorbent materials contained within each of filter beds 108a–108c. This will occur gradually from the inlet of first filter bed 108a until the wave of contaminants eventually exits third filter bed 108c. This wave of contaminants is not necessarily a sharp one, as adsorption and absorption kinetics may be slow compared to the residence time of the fluid in the three filter beds 108a–108c. This may result in the situation wherein small amounts of contaminant exit third filter bed 108c even though a substantial portion of the adsorbent or absorbent retains useful capacity. Since in most applications it is desirable to replace the adsorbent and/or absorbent before the contaminant level becomes problematic, a good deal of the adsorbing or absorbing material may be wasted.

Thus, also provided is a step of optimizing usage of filter beds 108a–108c by changing a location of at least one of the filter beds during replacement of the absorbent and/or adsorbent. In particular, the material located in first filter bed 108a (the inlet bed, i.e., the filter bed disposed nearest to inlet 136) is replaced with fresh material (e.g., new or cleaned adsorbent and/or absorbent material). The partially exhausted bed 108b is moved to the position formerly occupied by first filter bed 108a, thus becoming the inlet bed. The least exhausted filter (i.e., third filter bed 108c) is moved to the position formerly occupied by second filter bed 108b, while the fresh material in the housing of first filter bed 108a is replaced to the position formerly occupied by third filter bed 108c. In this way, each filter bed is used to the full extent of its useful life (i.e., until it can no longer perform its contaminant-removal function). This step can also be performed with any other type of fluid-treating component. Referring to FIGS. 1A and 1B, the optimizing step includes detaching first filter bed 108a from first bed port 112a (and discarding or cleaning first filter bed 108a), attaching second filter bed 108b to first bed port 112a, attaching third filter bed 108c to second bed port 112b, and attaching a fourth filter bed (e.g., a completely unused or cleaned component) to third bed port 112c. This step is performed after it is determined that first filter bed 108a has substantially reached its full usage (e.g., by a predetermined duration of usage).

By way of the above-described non-limiting examples, a wide variety of fluids can be treated in a system that is reliable, compact, flexible, and inexpensive.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A manifold assembly, comprising:
    a unitary manifold body including at least two component ports and an integral channel system connecting the component ports in series; and
    at least two fluid-treating components directly connected to the component ports in a substantially gas-tight manner, wherein the fluid-treating components include a coalescer configured to remove oil from a fluid.
2. The manifold assembly of claim 1, wherein the fluid-treating components include at least one of a coalescer, an adsorber, an absorber, a strainer, and a filter.
3. The manifold assembly of claim 1, wherein the fluid-treating components are configured to treat at least one of natural gas and air.
4. A manifold assembly, comprising:
    a unitary manifold body including at least two component ports and an integral channel system connecting the component ports in series;
    at least two fluid-treating components directly connected to the component ports in a substantially gas-tight manner; and
    a heat exchanger directly connected to an inlet port of the manifold body in a substantially gas-tight manner.
5. The manifold assembly of claim 4, wherein the inlet port is positioned in an area between the component ports.
6. The manifold assembly of claim 1, wherein longitudinal axes of the fluid-treating components are arranged to be substantially parallel.
7. The manifold assembly of claim 1, wherein,
    the integral channel system is substantially arranged in a plane, and
    each of the component ports is arranged such that a flow of fluid between the component port and an interfaced fluid-treating component is substantially orthogonal to the plane.
8. The manifold assembly of claim 1, wherein,
    the component ports are arranged on a first side of the manifold body, and
    a second side of the manifold body is disposed opposite from the first side.
9. The manifold assembly of claim 8, further comprising:
    at least one of a thermocouple, a pressure gage, and a high pressure switch disposed on the second side.
10. The manifold assembly of claim 1, wherein at least one of the component ports includes an inner port section and an outer port section, the outer port section including a flow distributor arranged around and concentric to the inner port section.
11. A manifold assembly, comprising:
    a unitary manifold body including at least two component ports and an integral channel system connecting the component ports in series; and
    at least two fluid-treating components directly connected to the component ports in a substantially gas-tight manner, wherein, at least one of the component ports includes an inner port section and an outer port section, the outer port section including a flow distributor arranged around and concentric to the inner port section, and the flow distributor is arranged as a helical ramp.

12. The manifold assembly of claim 1, wherein the fluid-treating components include three filter beds each configured to remove sulfur-containing molecules from a fluid.

13. A fluid manifold comprising:

a manifold body having:
   a first side including a plurality of component ports, each of which is adapted to directly attach to a fluid-treating component in a substantially gas-tight manner, and
   an integral channel system connecting each of the component ports in series, wherein the integral channel system is substantially arranged in a plane, wherein,
      at least one of the component ports includes an inner port section and an outer port section, the outer port section including a flow distributor arranged around and concentric to the inner port section, and
      the flow distributor is arranged as a helical ramp.

14. The fluid manifold of claim 13, wherein each of the component ports is adapted to directly attach to one of a coalescer, and a filter.

15. The fluid manifold of claim 13, wherein each of the component ports is arranged such that a flow of fluid between the component port and an attached fluid-treating component is substantially orthogonal to the plane.

16. The fluid manifold of claim 13, wherein the manifold body has a second side disposed opposite from the first side.

17. The fluid manifold of claim 16, wherein the first side and the second side are separate components joined together by at least one of fasteners, adhesive bonding, brazing, soldering, and welding.

18. The fluid manifold of claim 16, wherein the second side includes a secondary port adapted to interface with at least one of a thermocouple, a pressure gage, and a high pressure switch.

19. The fluid manifold of claim 16, wherein the second side includes an outlet port.

20. The fluid manifold of claim 13, wherein the first side includes an outlet port.

21. The fluid manifold of claim 13, wherein the manifold body has an outlet port disposed on an edge side of the manifold body.

22. The fluid manifold of claim 13, wherein the manifold body is a cast unitary structure.

23. The fluid manifold of claim 13, wherein the manifold body has an inlet port disposed on the manifold body and adapted to directly attach to a heat exchanger in a substantially gas-tight manner, the inlet port being positioned in a central area between the component ports.

24. The fluid manifold of claim 23, wherein the inlet port is disposed on the first side.

25. A method of handling fluid, comprising the steps of:
connecting at least two fluid-treating components directly to a manifold body, the manifold body having:
   a first side including at least two component ports configured to directly attach to the fluid-treating components in a substantially gas-tight manner, and
   an integral channel system connecting each of the component ports in series;
directing a fluid through each of the fluid-treating components in series via the integral channel system; and
cooling the fluid before the fluid enters the manifold body.

26. A method of handling fluid, comprising:
connecting at least two fluid-treating components directly to a manifold body, the manifold body having:
   a first side including at least two component ports configured to directly attach to the fluid-treating components in a substantially gas-tight manner, and
   an integral channel system connecting each of the component ports in series; and
directing a fluid through each of the fluid-treating components in series via the integral channel system, wherein the directing step includes removing oil from the fluid to create an oil-free fluid.

27. The method of claim 26, wherein the directing step includes removing sulfur-containing molecules from the oil-free fluid.

28. The method of claim 25, wherein the fluid-treating components include at least one of a coalescer, an adsorber, an absorber, a strainer, and a filter.

29. The method of claim 25, further comprising the step of connecting at least one of a thermocouple, a pressure gage, and a high pressure switch to a second side of the manifold body.

30. The method of claim 29, wherein the second side is disposed opposite from the first side.

31. A method of handling fluid, comprising:
connecting at least two fluid-treating components directly to a manifold body, the manifold body having:
   a first side including at least two component ports configured to directly attach to the fluid-treating components in a substantially gas-tight manner, and
   an integral channel system connecting each of the component ports in series;
directing a fluid through each of the fluid-treating components in series via the integral channel system; and
connecting a heat exchanger to an inlet port of the manifold body in a substantially gas-tight manner.

32. A method of handling fluid, comprising:
connecting at least two fluid-treating components directly to a manifold body, the manifold body having:
   a first side including at least two component ports configured to directly attach to the fluid-treating components in a substantially gas-tight manner, and
   an integral channel system connecting each of the component ports in series;
directing a fluid through each of the fluid-treating components in series via the integral channel system;
introducing a fluid into an inlet port of the manifold body;
directing the fluid through the integral channel system to a first fluid-treating component;
coalescing at least one of oil and water from the cooled fluid in the first fluid-treating component to create a filtered fluid;
directing the filtered fluid from the first fluid-treating component through, the integral channel system to a second fluid-treating component; and
removing at least one of adsorbable and absorbable constituents from the filtered fluid in the second fluid-treating component.

33. The method of claim 32, further comprising the step of directing the fluid from the second fluid-treating component through the integral channel system to an outlet port of the manifold body.

34. A method of handling fluid, comprising:
connecting at least two fluid-treating components directly to a manifold body, the manifold body having:

a first side including at least two component ports configured to directly attach to the fluid-treating components in a substantially gas-tight manner, and
an integral channel system connecting each of the component ports in series; and
directing a fluid through each of the fluid-treating components in series via the integral channel system, wherein natural gas is used as the fluid.

35. The method of claim 25, wherein air is used as the fluid.

36. A method of handling fluid, comprising:
connecting at least two fluid-treating components directly to a manifold body, the manifold body having:
a first side including at least two component ports configured to directly attach to the fluid-treating components in a substantially gas-tight manner, and
an integral channel system connecting each of the component ports in series;
directing a fluid through each of the fluid-treating components in series via the integral channel system; and
connecting a coalescer configured to remove oil from the fluid.

37. The method of claim 25, further comprising the step of connecting first, second, and third filter beds to first, second, and third bed ports of the component ports.

38. The method of claim 37, wherein each of the filter beds is configured to remove sulfur-containing molecules from a fluid.

39. A method of handling fluid, comprising:
connecting at least two fluid-treating components directly to a manifold body, the manifold body having:
a first side including at least two component ports configured to directly attach to the fluid-treating components in a substantially gas-tight manner, and
an integral channel system connecting each of the component ports in series;
directing a fluid through each of the fluid-treating components in series via the integral channel system;
connecting first, second, and third filter beds to first, second, and third bed ports of the component ports; and
optimizing usage of the filter beds by changing a location of at least one of the filter beds.

40. The method of claim 39, wherein,
the fluid is directed through the manifold body in order of the first, second, and third bed ports, and
the optimizing step includes:
detaching the first filter bed from the first bed port,
attaching the second filter bed to the first bed port,
attaching the third filter bed to the second bed port,
replacing at least one of an adsorbent material and an absorbent material from the first filter bed with a fresh material, and
attaching the first filter bed with the fresh material to the third bed port.

41. The method of claim 40, wherein the detaching step is performed after a determination that the first filter bed has substantially reached full usage.

42. A method of handling fluid, comprising:
connecting a heat exchanger and at least two fluid-treating components directly to a manifold body, the manifold body having:
a first side including at least two component ports configured to directly attach to the fluid-treating components in a substantially gas-tight manner, and
an integral channel system connecting each of the component ports in series;
directing a fluid through each of the fluid-treating components in series via the integral channel system; and
directly attaching the fluid-treating components to the component ports such that longitudinal axes of the heat exchanger and the fluid-treating components are substantially parallel to one another.

43. The method of claim 25, wherein at least one of the component ports includes an inner port section and an outer port section, the outer port section including a flow distributor arranged around and concentric to the inner port section.

44. A method of handling fluid, comprising:
connecting at least two fluid-treating components directly to a manifold body, the manifold body having:
a first side including at least two component ports configured to directly attach to the fluid-treating components in a substantially gas-tight manner, and
an integral channel system connecting each of the component ports in series; and
directing a fluid through each of the fluid-treating components in series via the integral channel system, wherein;
at least one of the component ports includes an inner port section and an outer port section, the outer port section including a flow distributor arranged around and concentric to the inner port section, and
the flow distributor is arranged as a helical ramp.

* * * * *